Feb. 13, 1951     W. W. BATEMAN     2,541,323
POWER TRANSMISSION FOR ICE SCORING MACHINES
Filed Feb. 20, 1950     3 Sheets-Sheet 1
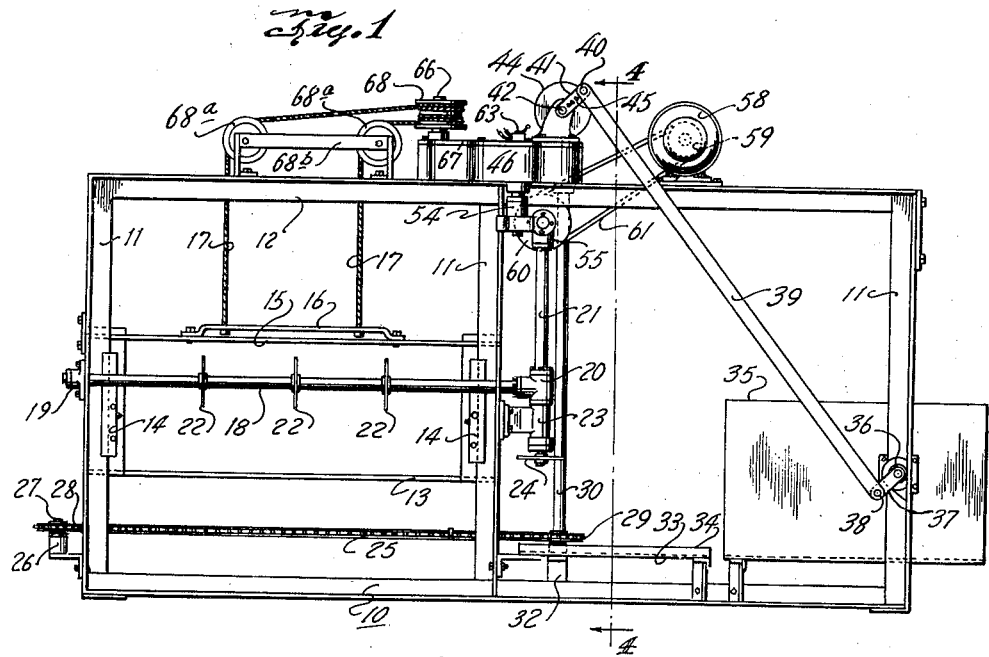
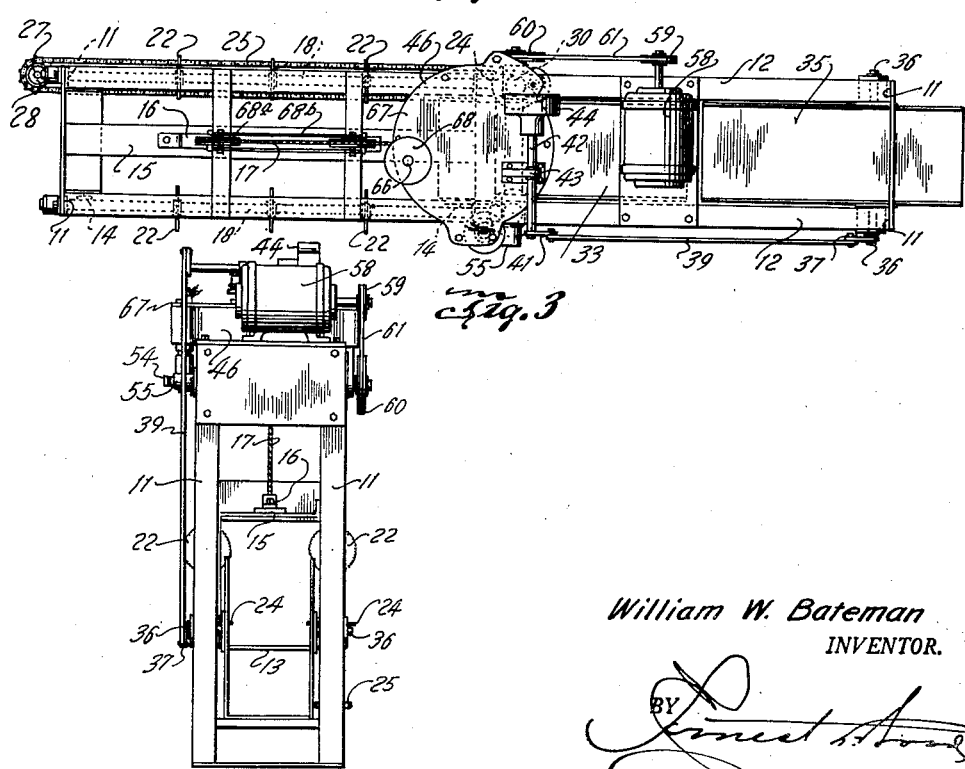
William W. Bateman
INVENTOR.
BY
ATTORNEY

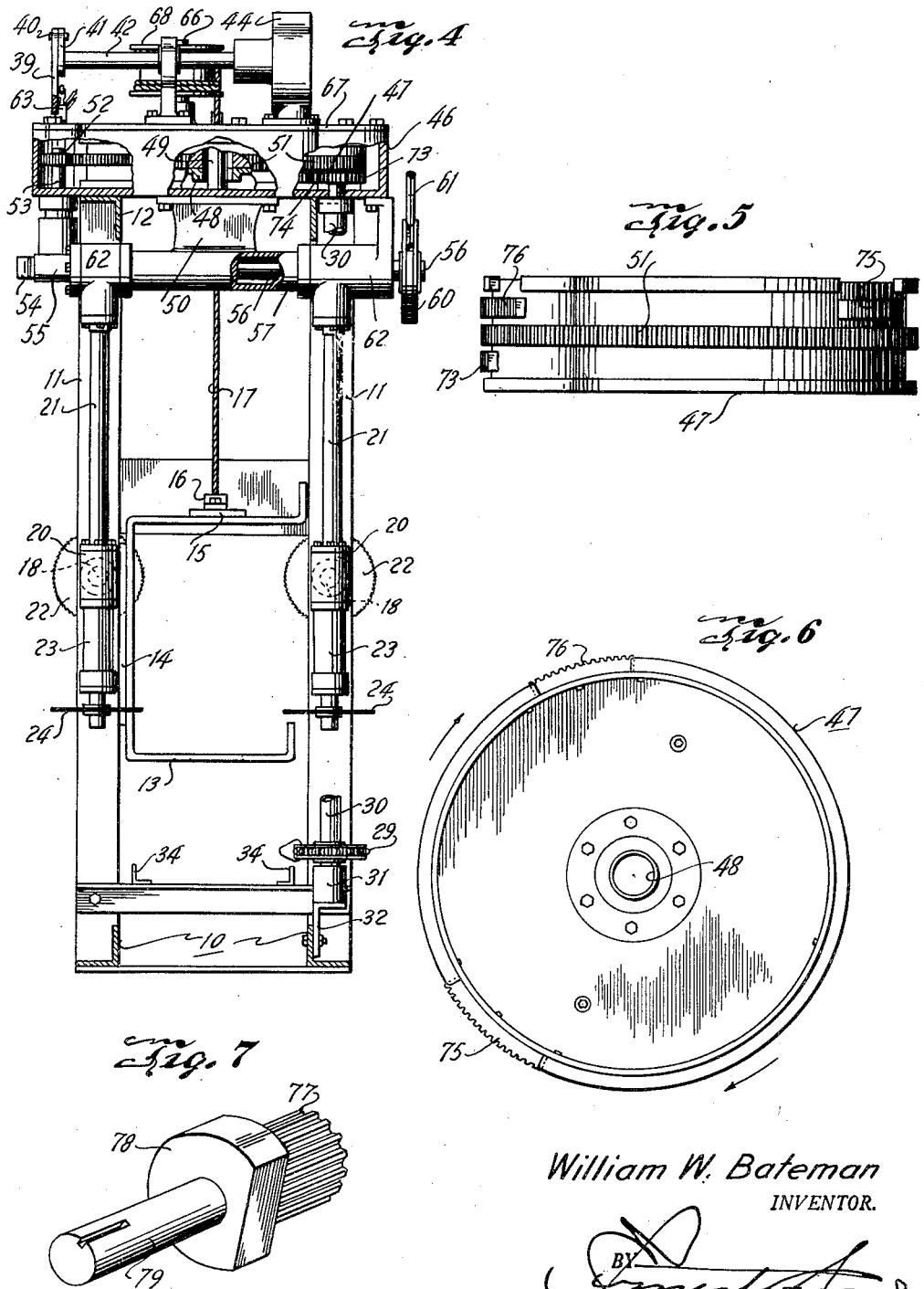

Feb. 13, 1951 W. W. BATEMAN 2,541,323
POWER TRANSMISSION FOR ICE SCORING MACHINES
Filed Feb. 20, 1950 3 Sheets-Sheet 3
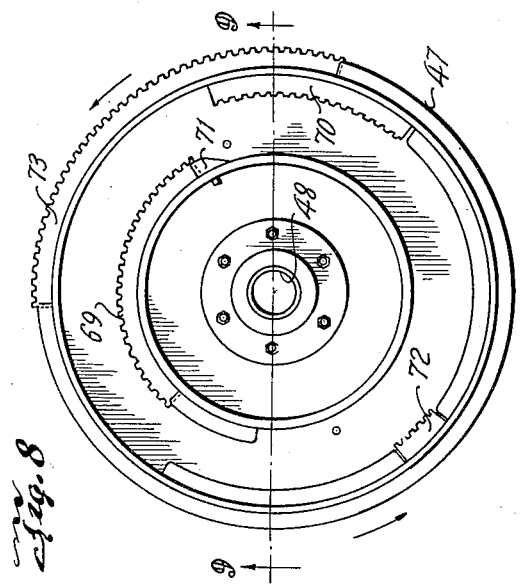
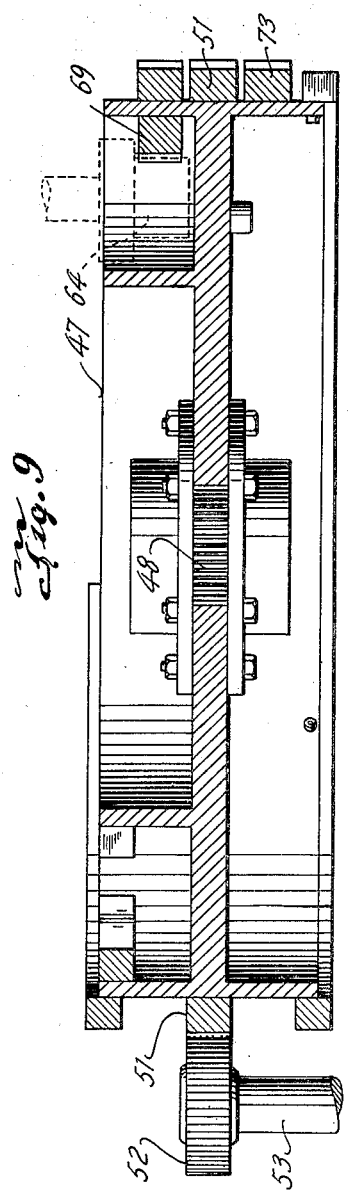
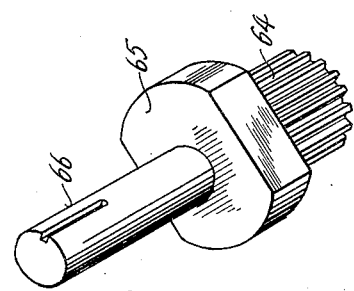
William W. Bateman
INVENTOR.
BY
ATTORNEY Patented Feb. 13, 1951

2,541,323

UNITED STATES PATENT OFFICE 2,541,323

POWER TRANSMISSION FOR ICE SCORING MACHINES

William W. Bateman, Mineral Wells, Tex.

Application February 20, 1950, Serial No. 145,221

9 Claims. (Cl. 125—13)

This invention relates to ice scoring machines and it has particular reference to a new and improved power unit for such machines.

The principal object of the invention is to reduce to a considerable extent the number of shafts, sprockets and chains ordinarily used to drive the various components of the conventional ice scoring machine and, in substitution thereof, to provide a power transmission consisting of an encased drum superimposed on the machine frame, having an external ring gear by which the drum is rotated and further provided with internal and external gear segments and cooperating pinions effective to actuate a cable sheave which, in turn, operates an elevator to move an ice block into the path of opposed, vertical saws for transverse scoring. Moreover, the power transmission of the invention propels shafts carrying the vertical saws as well as horizontal saws for producing longitudinal scores as the ice block is advanced through the machine by a conveyor also actuated by the power transmission. Finally, the power transmission operates a tilting cage or up-ender into which the scored ice block is advanced by the conveyor, to complete the operative cycle, after which the machine is automatically stopped.

Other objects will become manifest as the description proceeds, taken in connection with the accompanying drawings, wherein:

Figure 1 is a side elevational view of an ice scoring machine equipped with a power unit constructed according to the present invention.

Figure 2 is a top plan view.

Figure 3 is a front elevational view.

Figure 4 is a view in vertical section on a larger scale, taken on line 4—4 of Figure 1.

Figure 5 is a side elevational view of the power transmission drum per se.

Figure 6 is a bottom plan view of the power transmission drum.

Figure 7 is a perspective view of the external pinion and cam operated by the outer gear segments of the drum to actuate the ice conveyor and tilting cage.

Figure 8 is a top plan view of the power transmission drum per se.

Figure 9 is a view of the drum in diametrical cross-section on a larger scale, taken on line 9—9 of Figure 8, and Figure 10 is a detail perspective view of the internal pinion and cam operated by the inner gear segments of the drum to actuate the ice elevator.

In continuing with a more detailed description of the drawing, it is pointed out that the invention does not seek to embrace any of the elements of the ice scoring machine generally, which is of more or less conventional construction, except where certain of the elements cooperate with the invention to produce the new and improved result, that of transmitting power to operate the machine more efficaciously than hitherto accomplished by conventional means.

In Figures 1 to 4, the ice scoring machine is comprised of a frame made up of parallel base rails 10, uprights 11 at each end and at the midsection of the frame and which support the top rails 12.

The uprights 11 at the rear end of the frame and those at the midsection thereof serve as guides for an elevator consisting of a platform 13 for supporting a block of ice, not shown, and having at each end perpendicular cleats 14 slidably embracing the uprights 11. A longitudinal member 15 connects the cleats 14 at their upper ends and carries an anchoring strip 16 for the ends of two supporting cables 17.

Midway between the bottom and top rails 10 and 12 and on each side of the frame is mounted a shaft 18. These shafts are parallel and their rear ends are journaled in bearings 19, affixed to the rear uprights 11. The forward ends of these shafts enter gear housings 20 in which operate bevel gears for transmitting rotary motion from vertical shafts 21 to the shafts 18, thus to rotate a series of spaced apart saws 22 carried by each shaft 18.

The lower end of each vertical shaft 21 is supported by a bearing 23 which, as shown in Figure 1, is secured to an intermediate frame upright 11 and mounted on the lower end of each of these shafts 21 is a horizontal saw 24.

It is evident from the foregoing that a block of ice of proper dimensions mounted on the elevator 13 will be scored transversely as the elevator is raised. Also, when the ice block is lowered and moved longitudinally in the frame in a forwardly direction, a longitudinal score will be made therein on each side by engagement of the horizontal saws 24, to enable the block to be readily separated into smaller blocks of predetermined size.

To advance the block in the machine, a conveyor chain 25 is disposed to operate along one side of the frame at a point spaced upwardly from the bottom rails 10. To support the conveyor chain, a bracket 26 (Fig. 1) is mounted on a rear upright 11 to support a bearing and a stub shaft 27, the latter carrying a sprocket wheel 28. The chain 25 operates on this sprocket wheel and a like wheel 29 at the opposite end, mounted on a vertical shaft 30 (Fig. 4) the lower end of which is journaled in a bearing 31 which in turn is supported by a bracket 32 bolted to one of the base rails 10, as shown.

After the ice block is scored vertically, it is moved by the conveyor 25 longitudinally onto a platform 33 having vertical guide channels 34, thence into an up-ender of tilting cage 35. The tilting cage is supported by aligned pivots 36, mounted one on each side of the cage and journaled in bearings affixed to the foremost uprights 11. A crank arm 37 is affixed to one of the pivots 36, and to the end of the crank arm is pivoted at 38 the lower end of a connecting rod 39. The upper end of the rod 39 is pivoted at 40 to a second crank arm 41. The crank arm 41 is affixed to a short horizontal shaft 42, journaled in a bearing 43 on the top of the machine frame and enters a gear housing 44, which will be again referred to presently.

It will be observed in Figure 1 that the crank arm 41 is provided with longitudinally aligned holes 45. These holes afford an adjustment for the connecting rod 39 to determine the degree of tilt of the cage 35. If it is desired to deposit the block of ice on end after scoring, the setting of the connecting rod with respect to crank 41 is as shown in Figure 1. However, should it be desired to slide the block out of the machine in the same position as it was conveyed therethrough, then the upper end of the connecting rod would be connected in the hole of the crank 41 nearest its rotating axis which would allow displacement of the tilting cage 35 sufficient only to slide the ice block from the cage.

The foregoing description deals only with the ice scoring machine which, as stated, is generally of conventional design. The description to follow will explain the invention which is designed to operate the various components of the machine.

A housing 46 of generally circular formation is secured on top of the upper rails 12 of the machine frame at the approximate midsection thereof. Within this housing is rotatably mounted the so-called power transmission drum generally designated by reference numeral 47 in Figures 4, 5, 6, 8 and 9. This drum has a center bearing 48 which embraces a spindle 49 (Fig. 4), rising from a rigid support 50. The anti-friction bearing 48 allows the drum to turn without effort in the housing 46.

The drum has an annular gear 51 embracing the same at its midsection and is rotated by a gear 52 engaging the ring gear, as shown in the break-away of Figure 4 and is mounted on a shaft 53 whose lower end enters a gear housing 54 which contains a worm gear, not shown, driven by a worm in the branch 55 of the housing 54. A shaft 56 (Fig. 4) in a transverse shaft housing 57 drives the said worm and the shaft 56, in turn, is driven by a motor 58, (Figs. 1–3) through pulleys 59 and 60 and connecting belt 61.

As the motor 58 drives the drum 47 in the manner above explained, it also operates each of the vertical shafts 21 through meshed gears in each of the housings 62 to thus drive the horizontal scoring saws 24 on these shafts. Since the saw shafts 18 are driven from shafts 21 through gears in housings 20, the vertical saws 22 are simultaneously operated.

The motor 58 is energized only for the duration of the operating cycle and is de-energized when the ice block is discharged from the machine. A starting and stopping switch 63 on the top of the drum housing 46 has its operating arm disposed in the path of the crank arm 41 and is periodically engaged by the arm to determine the operating cycle of the machine.

To drive the elevator 13, a pinion 64 (Fig. 10) having an integral cam block 65 is adapted to operate within the drum 47 and its stub shaft 66 extends upwardly through the cover plate 67 of the drum housing 46 to receive a cable drum 68. On the cable drum 68 is wound the two cables 17 which support the elevator 13 and which cables pass over sheaves 68a supported in a frame 68b.

mounted on the top rails 12. The elevator receives the block of ice at floor level and is first raised to its highest point to produce the transverse scores by the vertical saws 22, after which it is lowered to a level with the platform 33 to permit the ice to be moved into the tilting cage 35 by the conveyor 25. Following passage of the ice into the cage 35, the elevator moves again the short distance to floor level to receive another ice block for scoring.

The pinion 64 is first engaged by the internal gear segment 69 of the drum 47 (Fig. 8) as the latter is rotated. The cable drum 68 is caused thereby to revolve to wind the cables 17 thereon, thus to raise the elevator to the upward limit of travel. The ice is scored transversely by the saws 22. As the drum 47 continues to revolve, an opposing gear segment 70 in the drum engages the pinion 64, rotating the same in the opposite direction, thus reversing the direction of rotation of the cable drum 68, to lower the elevator 13, the saws 22 passing through the scores previously made thereby. It is to be observed that the elevator is lowered only to the level of the platform 33 initially hence the gear segment 70 is shorter in length than the gear segment 69. In shifting from one to the other of the gear segments 69—70 to reverse the direction of the pinion 64, the cam 65 thereof is engaged by a lug 71 (Fig. 8) which insures proper meshing of the teeth of the pinion with those of the gear segment 70. As the drum 47 continues to rotate, the gear segment 70 will ride off the pinion, allowing for a pause during which the conveyor chain 25 functions to transfer the block of ice into the tilting cage 35. Following this operation, the short gear segment 72 (Fig. 8) engages the pinion 64 to lower the elevator 13 the short distance to the floor level preparatory to receiving another block of ice for scoring.

To operate the conveyor chain 25, an external gear segment 73 is affixed to the periphery of the drum 47 which is brought into engagement with a gear 74 (Fig. 4) on the upper end of vertical shaft 30, once during the operating cycle of the machine. The shaft 30, as previously explained, carries the sprocket 29 which drives the chain 25.

Spaced apart circumferentially on the periphery of the drum 47 are two short gear segments 75 and 76 (Fig. 6). Adapted for periodic engagement with these gear segments is a pinion 77 (Fig. 7) having an attendant integral cam block 78. The shaft 79 of this pinion extends upwardly through the cover plate 67 of the drum housing 46 into gear housing 44 previously mentioned. A gear, not shown, engages a bevel gear in the housing 44 which gear is mounted on the transverse shaft 42, on which is mounted the crank arm 41, adapted to actuate the connecting rod 39, crank arm 37 and tilting cage 35.

The gear segment 75, as it engages the pinion 77, levels the tilting cage 35 with respect to the platform 33 so that the conveyor 25 may move a block of ice into the cage. The length of the gear segment 73 is such as to allow time for the conveyor to complete its function.

The gear segment 76 is of the same length as segment 75 and serves to again actuate pinion 77 to raise the tilting cage 35 on its pivots 36 to dump the block of ice therein. As stated previously, the upper end of the connecting rod 39 may be adjusted to limit the degree of displacement of the tilting cage when it is desired to discharge a block of ice in a horizontal position.

It is evident from the foregoing that each of the internal and external gear segments of the power transmitting drum must be of predetermined length to bring about operation in sequence of the elevator 13, the conveyor 25 and tilting cage 35 and to predetermine the duration of operation of these elements. The saw shafts 18 and 21 continue to operate throughout the operating cycle of the machine which is, as previously stated, determined by the arm 41 engaging with the motor circuit switch 63, although it is not intended that the invention be limited to the specific location and mode of operating the switch.

Manifestly, the construction as shown and described is capable of some modification and such modification as may be construed to fall within the scope and meaning of the appended claims is also considered to be within the spirit and intent of the invention.

What is claimed is:

1. In an ice scoring machine having ice elevating, scoring and conveying means and tilting cage, a common operating means therefor comprising a drum mounted on the frame of said machine and adapted for rotation on a vertical axis, an annular gear ring embracing said drum, a motor circuit, a motor in said circuit, means engaging said annular gear ring and operated by said motor for rotating said drum, a plurality of annularly discontinuous gear segments interiorly of and rotatable with said drum, a pinion held against other than rotation and periodically driven by said gear segments, means actuated by said pinion for operating said elevator, a plurality of circumferentially discontinuous gear segments exteriorly of said drum, a pinion driven periodically by said exterior gear segments, rotatable means operated by said latter pinion for actuating said conveyor and tilting cage in sequence and switch means in the path of said rotatable means effective to open and close said motor circuit for predetermining the operating cycle of said drum.

2. In an ice scoring machine, a power transmission for operating in sequence an elevator, scoring means, conveyor and tilting cage of said machine, said power transmission comprising a drum rotatably mounted on the top of the frame of said machine, a motor circuit, a motor in said circuit for driving said drum, annularly spaced gear segments interiorly of said drum for actuating said elevator to move an ice block thereon into the path of the scoring means, circumferentially discontinuous gear segments on the exterior surface of said drum, a pinion driven thereby for actuating said conveyor to advance the scored block into said tilting cage, separate gear segments on the exterior surface of said drum, crank means and a connecting rod operated by said separate gear segments for actuating said tilting cage, means connecting said motor and drum for driving said drum and switch means periodically engageable by said crank means to open and close said motor circuit for predetermining the operating cycle of said machine.

3. In an ice scoring machine, a power transmission for operating in sequence an ice elevator, scoring saws, conveyor and tilting cage of said machine, said transmission comprising a horizontal operating drum rotatably mounted on the top of the frame of said machine, a motor circuit, a motor in said circuit for driving said drum, an annular gear embracing the exterior surface of said drum, a plurality of scoring saw shafts carrying saws, means for driving said saw shafts, a gear driven by said latter means for actuating said drum, a plurality of annularly discontinuous gear segments interiorly of said drum, a pinion driven by said gear segments for actuating said elevator to move ice thereon in relation to said scoring saws, a plurality of circumferentially discontinuous gear segments exteriorly of said drum, rotatable means in engagement with and driven by said exterior gear segments for actuating said conveyor and tilting cage in sequence and switch means in said motor circuit and disposed in the path of the rotatable means actuating said tilting cage for stopping said machine after each scoring cycle by opening said motor circuit.

4. The structure as set forth in claim 3, further defined in that the operating drum has inner and outer concentric flanges adapted to support, in confronting relationship, the internal gear segments to impart to the elevator actuating pinion alternate clockwise and counter-clockwise rotation.

5. The structure of claim 4, further defined in that a cable drum is driven by the elevator actuating pinion, on which is wound cables supporting the elevator, the latter being controlled in its movements by alternate engagement of the internal gear segments with the elevator actuating pinion during rotation of the operating drum.

6. In an ice scoring machine, a power transmission for operating an elevator, ice scoring saws, conveyor and tilting cage of said machine, said transmission comprising an operating drum rotatably mounted on the frame of said machine having a ring gear embracing the same, a plurality of internal and external circumferentially discontinuous gear segments carried by said drum, means driven by the internal gear segments of said drum for actuating said elevator, means driven by external gear segments of said operating drum for actuating said conveyor, a pinion periodically engaged by circumferentially discontinuous external gear segment of said operating drum, a shaft rotated by said pinion, a crank on said shaft, a second crank carried by said tilting cage, a connecting rod for imparting rotation to said second crank from said first crank to raise and lower said tilting cage, a motor, means operated by said motor for actuating said scoring saws, means engaging the ring gear of said drum and operated by said latter means for rotating said drum and switch means periodically engageable by said first crank for de-energizing said motor after each scoring cycle of said machine.

7. The structure of claim 6, in which the paths of the internal gear segments of the operating drum are concentric to dispose the gear segments in confronting relationship, and a pinion mounted between the paths of the gear segments to be engaged thereby during rotation of the drum to effect clockwise and counterclockwise rotation of said pinion.

8. The structure of claim 6, further defined in that the throw of the connecting rod is adjustable in relation to the first crank to increase and decrease the degree of tilt of the tilting cage.

9. An ice scoring machine as set forth in claim 6, further defined in that the external circumferentially discontinuous gear segments are correlated on the operating drum to effect operation of the conveyor and tilting cage in sequence.

WILLIAM W. BATEMAN.

No references cited.